United States Patent
Tanaka (10) Patent No.: US 8,514,445 B2
(45) Date of Patent: Aug. 20, 2013

(54) IMAGE PROCESSING SYSTEM, MEMORY MANAGEMENT METHOD, COMPUTER READABLE STORAGE MEDIUM, AND IMAGE PROCESSING APPARATUS

(75) Inventor: Kazuyoshi Tanaka, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1092 days.

(21) Appl. No.: 12/416,275

(22) Filed: Apr. 1, 2009

(65) Prior Publication Data

US 2009/0251734 A1 Oct. 8, 2009

(30) Foreign Application Priority Data

Apr. 7, 2008 (JP) ................................ 2008-098942

(51) Int. Cl.
  *G06K 15/00* (2006.01)
(52) U.S. Cl.
  USPC ............................... 358/1.6; 358/1.2; 358/1.7
(58) Field of Classification Search
  USPC .......................... 358/1.2, 1.16, 1.17, 1.6, 1.7
  See application file for complete search history.

(56) References Cited

U.S. PATENT DOCUMENTS

| | | | | |
|---|---|---|---|---|
| 5,852,710 | A * | 12/1998 | Shiohara et al. | 358/1.16 |
| 6,028,676 | A * | 2/2000 | Nakao | 358/1.16 |
| 6,124,942 | A * | 9/2000 | Ichinowatari | 358/1.17 |
| 6,449,056 | B1 * | 9/2002 | Mishima et al. | 358/1.16 |
| 6,567,177 | B2 * | 5/2003 | Matsuyama | 358/1.14 |
| 7,218,412 | B2 * | 5/2007 | Tanaka | 358/1.16 |
| 7,355,739 | B2 * | 4/2008 | Irino | 358/1.16 |
| 2002/0030853 | A1 * | 3/2002 | Kizaki et al. | 358/1.16 |

FOREIGN PATENT DOCUMENTS

| | | |
|---|---|---|
| JP | H03-163952 A | 7/1991 |
| JP | 05-303743 | 11/1993 |
| JP | 10-145570 | 5/1998 |
| JP | 11-187079 | 7/1999 |
| JP | 2001-94707 A | 4/2001 |

OTHER PUBLICATIONS

Japanese Office Action dated Mar. 12, 2012 in corresponding Japanese Patent Application No. 2008-098942.
European Search Report dated Jun. 18, 2012 in corresponding European Patent Application No. 09157163.
Notice of Reasons for Refusal, mailed Oct. 12, 2012 in Japanese Application No. 2008-098942.
Communication Pursuant to Article 94(3) EPC issued by European Patent Office on Mar. 21, 2013 in European Application No. 09 157 163.8-1959. (4 pages).

* cited by examiner

*Primary Examiner* — Charlotte M Baker
*Assistant Examiner* — Jonathan Beckley
(74) *Attorney, Agent, or Firm* — Buchanan Ingersoll & Rooney PC (57) ABSTRACT

In an image processing system including an image processing apparatus 30 for receiving and memorizing image data created based on print data of a Page Description Language onto a memory section 35 while performing a processing based on the image data, the image processing system includes a control section (memory management section 31*a*) for calculating a remaining amount of a capacity of the memory section 35 and a remaining amount of a quantity of the image data that can be memorized to the memory section 35, for selecting the lesser of the remaining amount of a quantity of the image data and the remaining amount of a capacity of the memory section 35 and for performing a control based on the selected remaining amount.

7 Claims, 5 Drawing Sheets

FIG. 1

IMAGE PROCESSING SYSTEM

FIG. 6

IMAGE PROCESSING SYSTEM, MEMORY MANAGEMENT METHOD, COMPUTER READABLE STORAGE MEDIUM, AND IMAGE PROCESSING APPARATUS

TECHNICAL FIELD

The present invention relates to an image processing system, a memory management method that manages a memory section that memorizes image data, a storage medium that memorizes a memory management program and an image processing apparatus.

BACKGROUND

A copying machine provided with a copy function, a facsimile machine provided with a facsimile function, a printer provided with a printer function, and a multi function peripheral provided with these functions and a scanner function (these are hereafter generically called an image processing apparatus) have become popularized (for example, refer to Japanese Patent Application Publication No. 2001-94707). In the case of performing printing using this image processing apparatus, first, print data of Page Description Language form (PDL: Page Description Language) is received from a client connected to a network. Next, the print data is rasterized (bit map development) to generate multi value image data (for example, 8 bits). Then the multi value image data is screened (formation of a binary value), and binary image data is generated. An image adjustment is performed to the binary image data, and the binary image data is outputted onto a paper sheet.

However, in the case of a system to which a plurality of image processing apparatuses is connected via a network, when each image processing apparatus executes a processing of generating the multi value image data from the print data (it is hereafter called RIP (Raster Image Processor) processing) and a screening processing of the multi value image data, a function for executing the above-mentioned processing must be given to each image processing apparatus. Therefore, the structure of the image processing apparatus becomes complicated. So, in such a system, there is adopted a structure in which a controller having the above-mentioned RIP processing function and screening processing function is connected to the network, and performs the above-mentioned processes on behalf of each image processing apparatus.

Figure 6:
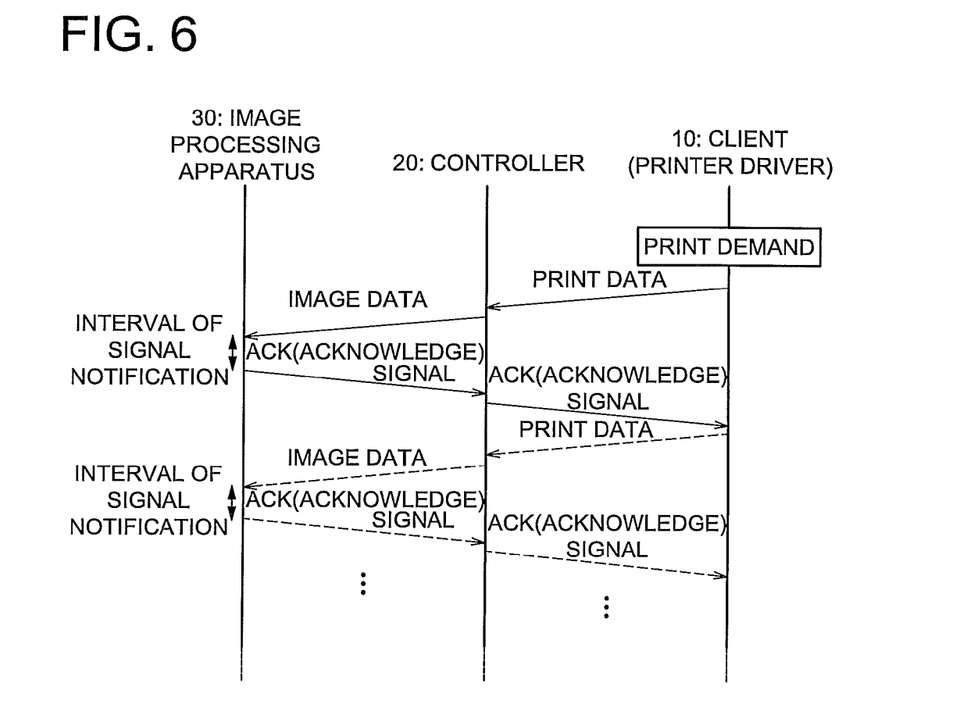
FIG. 6 illustrates a timing chart showing a flow of data in the apparatus processing system.

In such a system, as illustrated in FIG. 6, a printer driver of the client converts document data created with an application into the print data of Page Description Language form, and transmits the data to the controller. The controller performs the RIP processing and the screening processing to the print data, creates the image data, and transmits the image data to the image processing apparatus. In the image processing apparatus, the image data is stored in the memory section, such as a RAM (Random Access Memory) and HDD (Hard Disk Drive), and a print is sequentially executed. When acceptance preparation of image data based on the next print data is completed, the image processing apparatus will send an ACK (acknowledge) signal to the controller. The controller sends this notice to the printer driver, and the printer driver transmits the next print data in response to this notice.

Here, in case where the ACK (acknowledge) signal is transmitted immediately after the completion of storing the image data, the image data is transmitted one after another and eventually, the memory section of the image processing apparatus will not be able to store the image data. In this case, the image processing apparatus notifies the controller of an overflow, and the controller sends this notice of overflow to the printer driver of the client. The printer driver receives this notice of overflow, and stops or suspends the transmission of print data.

When such overflow occurs, a print processing backs up. Therefore, the interval of the ACK (acknowledge) signal notification is increased, and a control for delaying the transmission of the print data from the printer driver is performed.

Thus, when the interval of the ACK (acknowledge) signal notification is increased, the overflow will become difficult to occur. However, the transmission of the print data from the printer driver backs up, and the print processing delays. On the other hand, when this interval is decreased, the print processing will not be delayed, but the image data will be transmitted one after another and eventually, the overflow will occur. Therefore, it becomes important to appropriately set up the interval of the ACK (acknowledge) signal notification corresponding to the occasional status. Consequently, conventionally, a control in which the interval of the ACK (acknowledge) signal notification is increased when a remaining amount of the memory section is lessened based on the remaining amount of the memory section of the image processing apparatus has been performed.

Here, the remaining amount usually means a capacity (an area of a storage area), which is not in use. For example, in the case where 1 GB of storage area is assigned to store the image data, the remaining amount being 20% means that 200 MB of storage area remains. However, the image data is usually managed by a management table with a limit. In the case where quantity of the image data exceeds the quantity capable of being managed by this management table, even when there is an allowance in capacity, no more image data can be managed. Therefore, it will be in an overflow state.

Thus, for example, although remaining amount of the storage area is 20%, in the case where the remaining amount of an element (called a node hereafter) of the management table is only 1 or 2 bytes, the overflow will occur at a stage in which the image data based on the next print data has been received.

Therefore, there had been a problem in which the processing cannot efficiently and securely be executed when the interval of the ACK (acknowledge) signal notification is managed on the basis of this remaining amount. This remaining amount is displayed on a panel of the image processing apparatus to notify the remaining amount to the user so that the user is able to determine whether to transmit the next print data or perform a reading of a document. Also in this case, when the remaining amount based on the capacity of the memory section is displayed, the overflow occurs even when the capacity has allowance, but the quantity of the node is lessened. Thus, there is a problem that the processing cannot efficiently and securely be executed.

The present invention is made in view of the above-mentioned problems. An object of the present invention is to provide an image processing system, a memory control method and a memory management program which can efficiently and securely execute processing.

SUMMARY

In order to attain the above-mentioned object, an aspect of the present invention is an image processing system including an image processing apparatus for receiving and memorizing image data created based on print data of a Page Description Language into a memory section while performing a processing based on the image data; and a control section for calculating a remaining amount of a capacity of the memory section and a remaining amount of a quantity of the image data that can be memorized to the memory section, for selecting the lesser of the remaining amount of a quantity of the image data and the remaining amount of a capacity of the memory section and for performing a control based on the selected remaining amount.

Another aspect of the present invention is the above described image processing system, wherein the control to be performed by the control section is a control to adjust an interval of a notice that permits transmission of next image data, wherein the notice is provided to a controller that creates the image data based on the print data and wherein the control section can be structured for performing a control to increase an interval of the notice in a case where the lesser of the remaining amounts becomes equal to or less than a threshold value that specifies a minimum value.

Another aspect of the present invention is the above described image processing system, wherein the control to be performed by the control section is a control to display a state of the memory section onto a panel of the image processing apparatus, and wherein the control section can be structured to perform a control to display the lesser of the remaining amounts onto the panel.

DESCRIPTION OF THE PREFERRED EMBODIMENT

As illustrated in the background art, in a system, which is configured by a client (a printer driver), a controller and an image processing apparatus, the printer driver of the client transmits print data in Page Description Language form to a controller. The controller performs a RIP processing and a screening processing to the print data and creates image data. The image data is transmitted to the image processing apparatus. In the image processing apparatus, the image data is stored in a memory section, such as a RAM and a HDD, and a print is executed. The image processing apparatus notifies a controller of an ACK (acknowledge) signal, which notifies that the following print data may be transmitted. The controller notifies the printer driver of the ACK (acknowledge) signal. In response to receiving the notice, the printer driver transmits the following print data.

In the above-mentioned control (so-called handshake), in case when the interval of the ACK (acknowledge) signal notification is intentionally increased, the transmission of the following print data will delay. Although an overflow becomes difficult to occur, a print process will be delayed. On the other hand, in case when the interval of the ACK (acknowledge) signal notification is intentionally decreased, the transmission of the following print data quickens and the print process will be quicker. However, the overflow will easily occur.

Therefore, in order to appropriately set up the interval of the ACK (acknowledge) signal notification, it is necessary to precisely determine how much image data can be stored in the memory section. Conventionally, the above-mentioned interval had been set up based on a remaining amount of the capacity (area of a storage area) of the memory section.

However, an internal program of the image processing apparatus that manages the image data prepares a management table, such as FAT (File Allocation Tables), and manages whereabouts of the image data, such as which image data will be arranged where. While searching for the management table, the internal program efficiently stores new image data into a vacant place, and deletes the stored image data or arranges the stored image data into a reusable state. The number of nodes that this management table is capable of managing (quantity of memorizable image data) is limited. For example, the maximum limit of the number may be 10,000. On the other hand, the image data may have a special feature that its size will drastically change with the number of colors, the number of pixels and compression degree. Therefore, for example, in case when a large quantity of the image data of a very small size is stored in the memory section, the number of nodes reaches the maximum limit before using up the storage area of the memory section so that the overflow will occur.

Accordingly, in the present invention, while taking the management method of the image data and the characteristics of the image data in the image processing apparatus into account, not only the remaining amount of the capacity of the memory section but also the remaining amount of the node are taken into account to appropriately manage the image data.

Concretely, the control section of the image processing apparatus monitors the quantity and the capacity of the image data capable of being memorized in the memory section. Then the control section of the image processing apparatus performs control for adjusting the interval of the ACK (acknowledge) signal notification based on the lesser of the remaining amounts. The control section of the image processing apparatus monitors the quantity and the capacity of the image data capable of being memorized in the memory section, and performs control for displaying the lesser of the remaining amounts onto a panel.

Thereby, in case when the node has an allowance and the capacity has no allowance or in case when the node has no allowance and the capacity has an allowance, the overflow does not easily occur and the process can efficiently and securely be executed.

EXAMPLE

Embodiment 1

Figure 1:
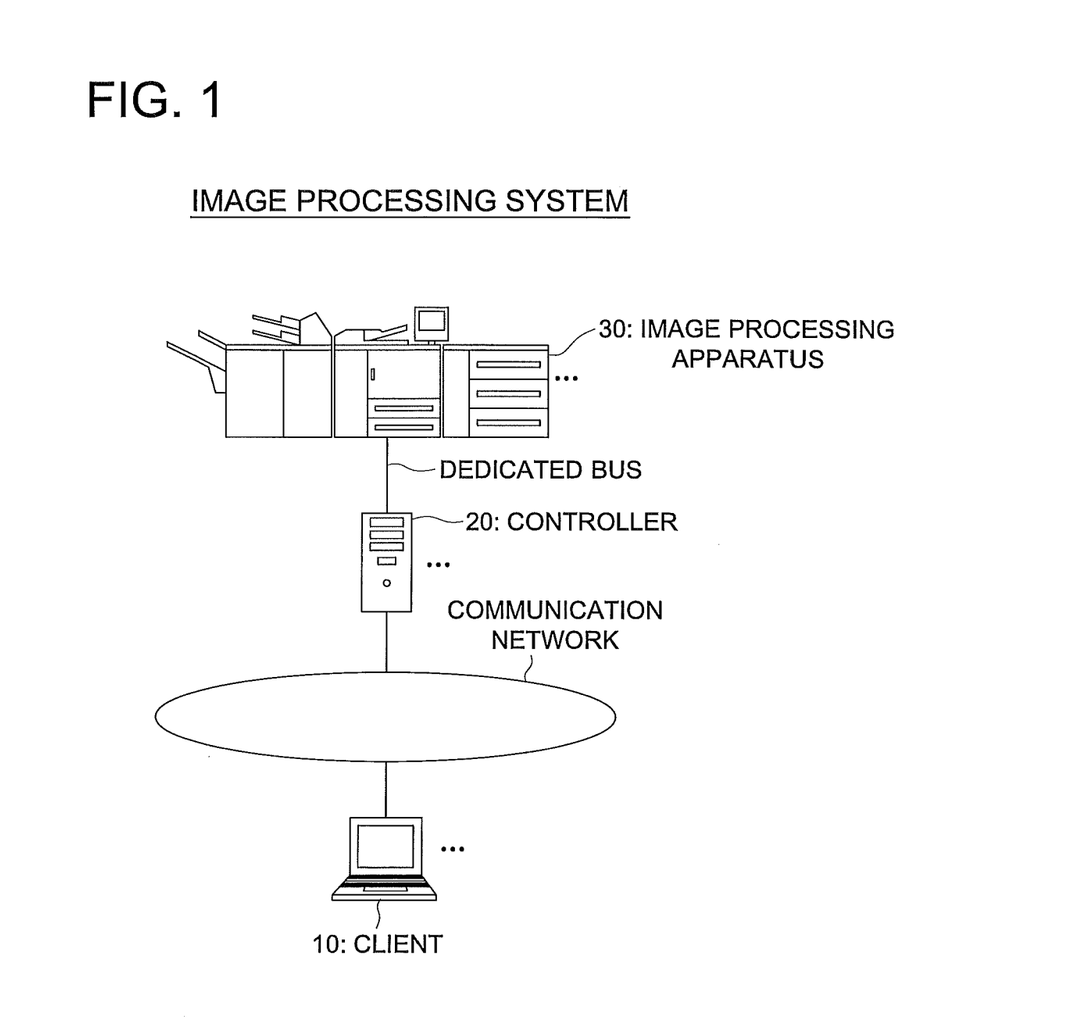
FIG. 1 illustrates a configuration of an image processing system related to a first embodiment of the present invention.
Figure 2:
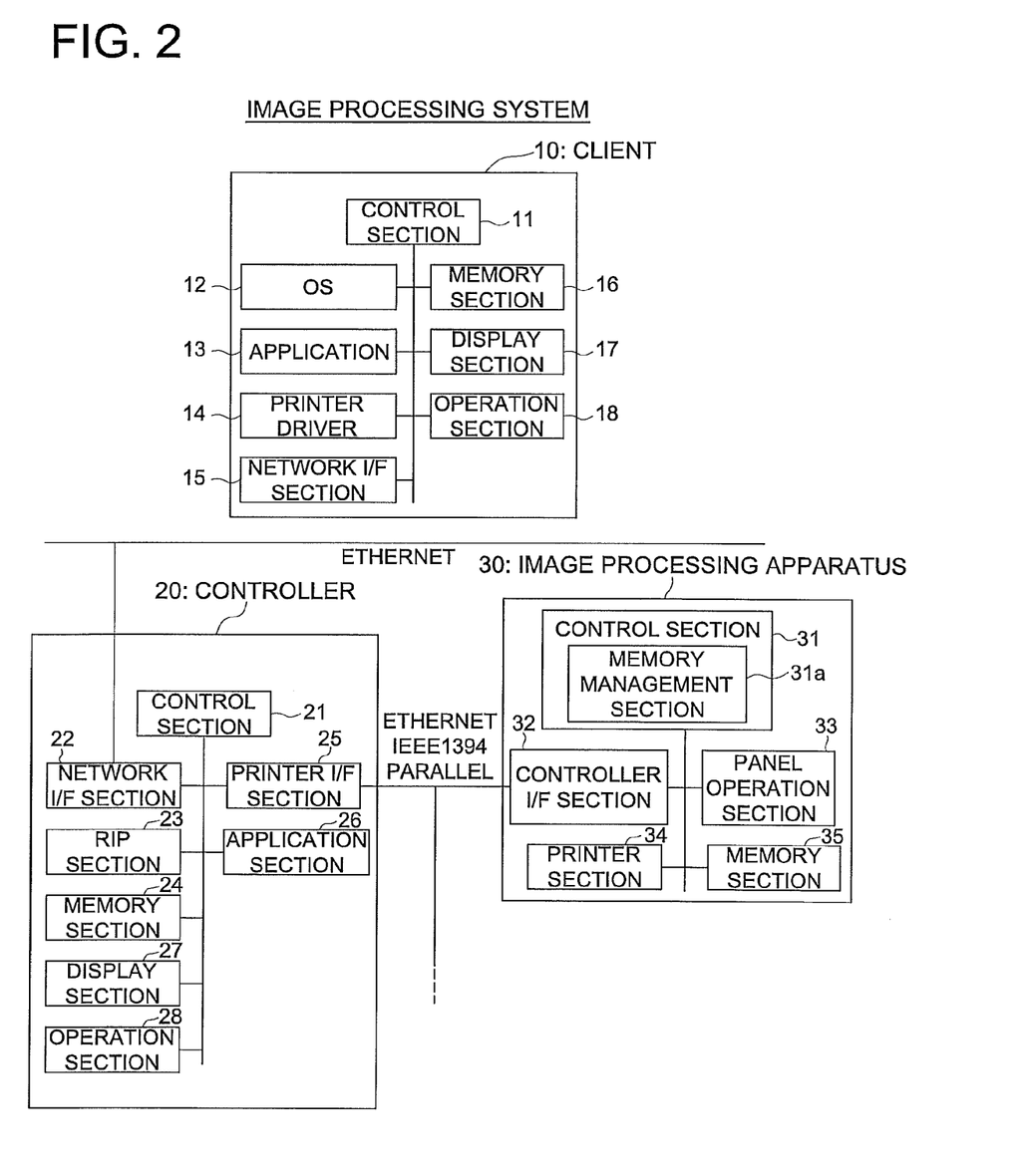
FIG. 2 illustrates a block diagram showing a concrete configuration of the image processing system related to the first embodiment of the present invention.
Figure 3:
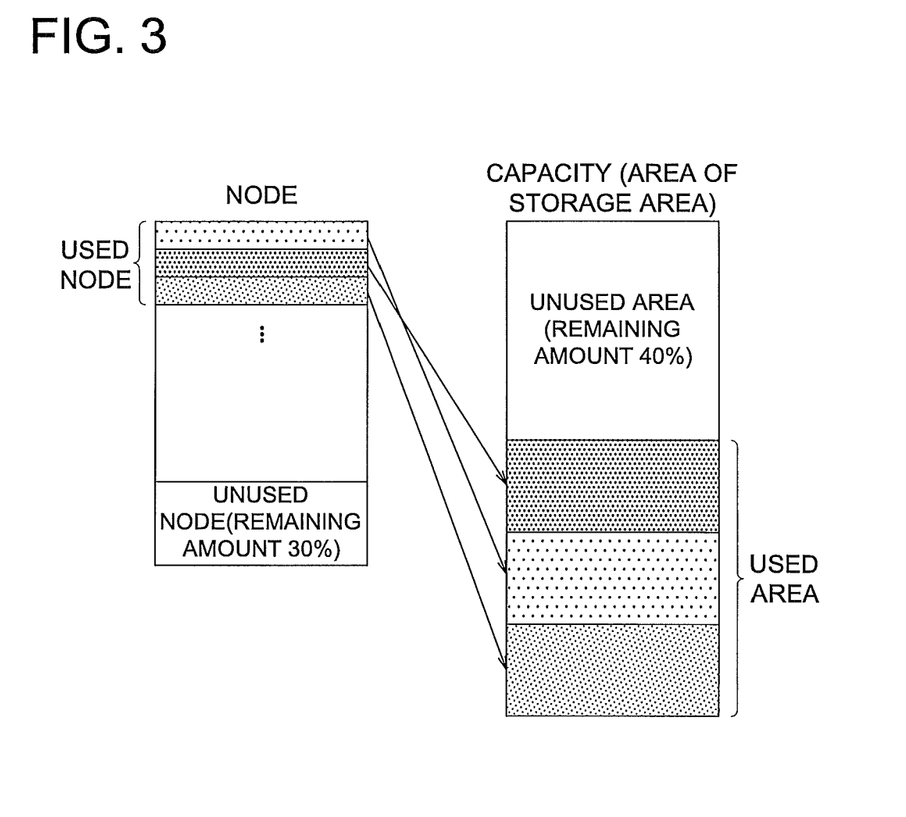
FIG. 3 illustrates a schematic configuration of a memory section of an image processing apparatus related to the first embodiment of the present invention.
Figure 4:
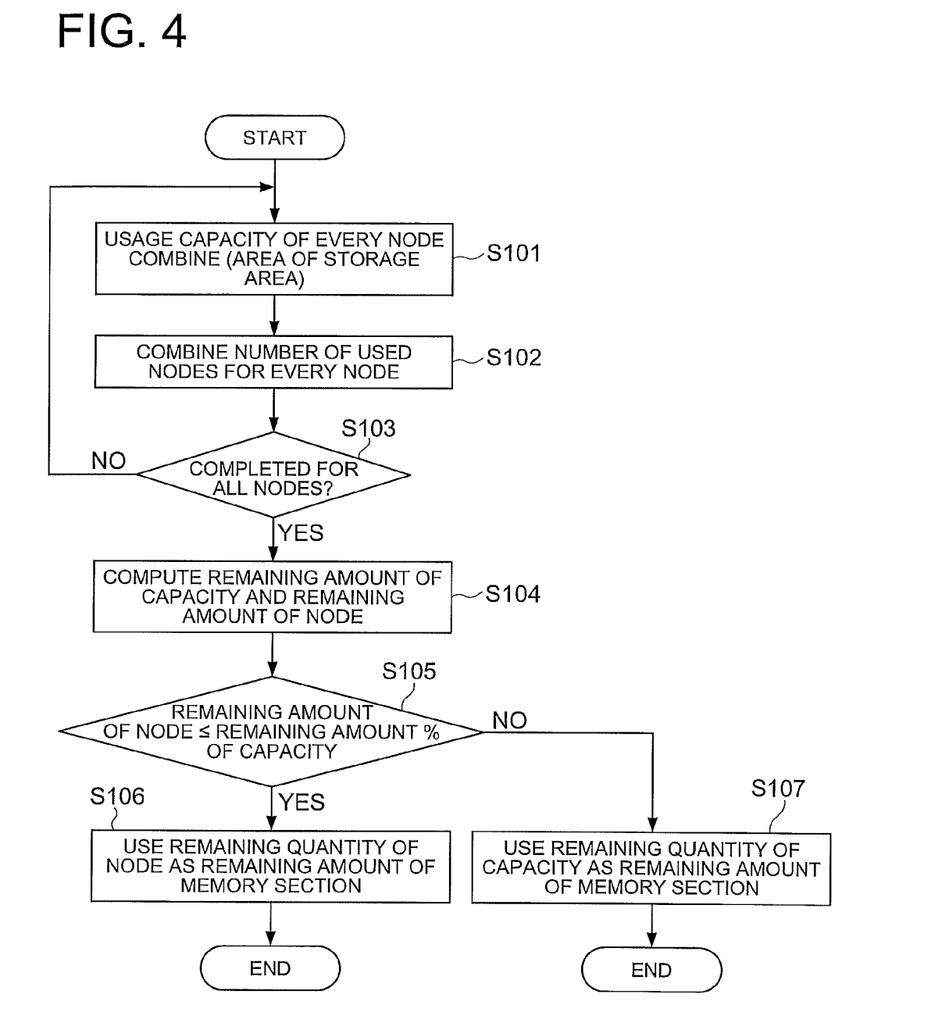
FIG. 4 illustrates a flow chart showing a procedure of memory management in the image processing system related to the first embodiment of the present invention.
Figure 5:
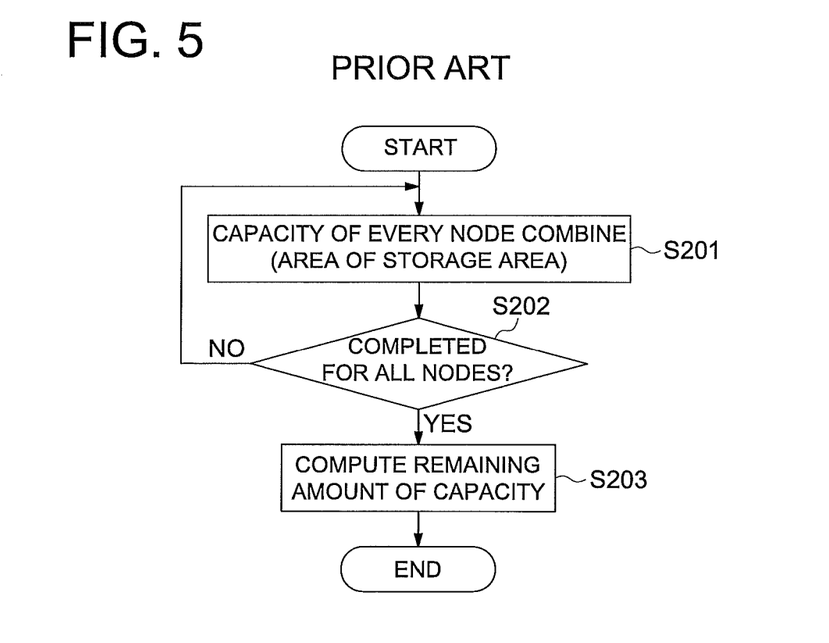
FIG. 5 illustrates a flow chart showing a procedure of memory management in a conventional image processing system.

In order to describe the above-mentioned embodiment of the present invention more in detail, an image processing system, a memory management method and a memory management program, which are related to the first embodiment of the present invention, will be described in reference to FIG. 1 to FIG. 5. FIG. 1 illustrates a schematic configuration of the image processing system related to this embodiment. FIG. 2 illustrates a block diagram showing a concrete configuration of each apparatus of the image processing system related to this embodiment. FIG. 3 illustrates a schematic configuration of a memory section of an image processing apparatus related to this embodiment. FIG. 4 illustrates a flow chart showing a procedure of memory management in the image processing system related to this embodiment. FIG. 5 illustrates a flow chart showing a procedure of memory management in a conventional image processing system.

As illustrated in FIG. 1, in the image processing system of this embodiment, a client 10 that is capable of being connected with a communication network, a controller 20 and an image processing apparatus 30 are arranged on intranet. As a standard of the communication network, Ethernet (registered trademark) can be used. However, besides Ethernet (registered trademark), IEEE1394 and Parallel can also be used for the data transfer from the controller 20 to the image processing apparatus 30. In FIG. 1, the controller 20 is independent of the image processing apparatus 30. However, the controller 20 may be included in the image processing apparatus 30.

The client 10 is a computer apparatus, such as a personal computer. The client 10 may be configured by a control section 11, an OS (Operating System) 12, an application 13, a printer driver 14, a network I/F section 15, a memory section 16, a display section 17 and an operation section 18.

The control section 11 is configured by a memory, such as a CPU (Central Processing Unit), a ROM (Read Only Memory) and a RAM (Random Access Memory). The control section 11 controls the entire operation of the client 10. The OS 12 may be Windows (registered trademark) or Macintosh (registered trademark). The OS 12 enables the operation of the application 13 on the client 10. The application 13 is software for creating document data. The printer driver 14 converts the document data created by the application 13 into the print data of the language (PDL, such as PCL (Printer Control Language) and PostScript) that can be read by the controller 20. The network I/F section 15 is configured by a NIC (Network Interface Card). The network I/F section 15 connects the client 10 to the communication network. The memory section 16 is configured by a memory and HDD (Hard Disk Drive). The memory section 16 memorizes the print data. The display section 17 is configured by a LCD (Liquid Crystal Display). The display section 17 displays a document creation screen and a print screen. The operation section 18 is configured by a mouse and a keyboard. The operation section 18 enables the operation of printing instructions.

The controller 20 is an apparatus that controls the image processing apparatus 30 in accordance with the instructions of the client 10. The controller 20 is configured by a control section 21, a network I/F section 22, a RIP section 23, a memory section 24, a printer I/F section 25 and an application section 26. In addition, when needed, the controller 20 will also be provided with a display section 27 and an operation section 28.

The control section 21 is configured by a memory, such as the CPU, the ROM and the RAM. The control section 21 controls the entire operation of the controller 20. The network I/F section 22 is configured by the NIC. The network I/F section 22 connects the controller 20 to the communication network. The RIP section 23 translates the print data written in PDL. Then the RIP section 23 extracts the print data to the image data of bit map form. The memory section 24 is configured by the memory and the HDD. The memory section 24 memorizes the print data and the image data. The printer I/F section 25 instructs the image processing apparatus 30 of the transmission and of the output method of the image data. The application section 26 edits a job ticket for performing processes of editing and finishing the image data created in the RIP section 23. Then the application section 26 performs data control for printing. The display section 27 is configured by LCD. The display section 27 displays various setting screens. The operation section 28 is configured by a mouse and a keyboard. The operation section 28 enables various operations.

The image processing apparatus 30 is an apparatus, which executes printing based on the instructions of the controller 20. The image processing apparatus 30 is configured by a control section 31, a controller I/F section 32, a panel operation section 33, a printer section 34 and a memory section 35.

The control section 31 is configured by a memory, such as a CPU, a ROM and a RAM. The control section 31 controls the entire operation of the image processing apparatus 30. The controller I/F section 31 is configured by the NIC. The controller I/F section 31 enables the communication with the controller 20. The panel operation section 33 is provided with a pressure-sensitive type operation section (touch panel) onto which a transparent electrode is arranged in grids on the display section. The panel operation section 33 enables the operation and the registration of setting information of the image processing apparatus 30. The printer section 34 is configured by a photoreceptor, a charging device, an exposure device, a development device, a transfer device and a fixing device. The printer section 34 executes printing in accordance with the printing instructions. The memory section 35 is configured by a memory and HDD. The memory section 35 memorizes a threshold value (namely, the minimum value of the remaining amount that specifies a point to which the remaining amount of the memory section 35 decreases and the interval of the ACK (acknowledge) signal notification will be increased) used as the standard that controls the interval of the image data and the ACK (acknowledge) signal notification.

The control section 31 monitors the quantity (the manageable number of nodes) and capacity (area of a storage area) of the image data capable of being memorized into the memory section 35, and computes and compares the remaining amounts of the quantity and of the capacity. The control section 31 functions as a memory management section 31a, which controls the interval of notifying the controller 20 of the ACK (acknowledge) signal based on the lesser of the remaining amounts. This memory management section 31a may be configured by hardware. A computer may be arranged with a memory management program that functions as the memory management section 31a. And the memory management program may be arranged to be executed on the controller section 31.

FIGS. 1 and 2 show an example of the image processing system of this embodiment of the present invention. As long as the image processing apparatus 30 functions as the memory management section 31a, the configuration can arbitrarily be changed.

Here, in the conventional image processing system as illustrated in the flow chart of FIG. 5, the control section of the image processing apparatus combines the capacity (area of the storage area) of each node (STEP S201), performs this process to all the nodes (STEP S202), combines the remaining amount of the memorizable capacity based on all the capacity of the memory section (STEP S203), and determines whether to increase or decrease the interval of the ACK (acknowledge) signal notification.

However, in the image processing apparatus 30, in order to manage the whereabouts of the image data, such as which image data will be arranged where, as illustrated in FIG. 3, individual image data is managed with the management table. In case when the remaining amount of either the capacity or the node is gone, the image data cannot be memorized any more, and an overflow will occur. Accordingly, in the image processing system of this embodiment of the present invention, the control section 31 (the memory management section 31a) of the image processing apparatus 30 performs a control as illustrated in the flow chart of FIG. 4.

Concretely, the capacity (area of the storage area) of each node is combined in STEP S101. Then the number of the node of each node is combined in STEP S102. Then this process is performed on all the nodes (STEP S103).

Next, the number of usable node (the remaining amount of the nodes) and the usable capacity (remaining amount of the capacity) are combined based on the capacity of the memory section 35 and the number of node in the management table in STEP S104. Then these are compared in STEP S105.

In case when the remaining amount of the node is less than the remaining amount of the capacity, various controls are performed using the remaining amount of the nodes in STEP S106. In case when the remaining amount of the capacity is less than the remaining amount of the nodes, various controls are performed using the remaining amount of the capacity in STEP S107.

As an example of this control, for example, in case the lesser of the remaining amount of the node and the remaining amount of the capacity becomes not more than a predetermined threshold value, the interval of the ACK (acknowledge) signal notification is increased and the transmission of the following print data is delayed to prevent the overflow from occurring.

In the above-mentioned flow, the lesser of the remaining amount of the node and the remaining amount of the capacity was automatically selected. However, the flow may be arranged so that a user can select either the remaining amount of a node or the remaining amount of capacity.

Thus, the number of the usable nodes (remaining amount of the node) and the usable capacity (remaining amount of the capacity) are computed, and the interval of the ACK (acknowledge) signal notification is controlled based on the lesser of the remaining amounts. Therefore, the overflow can be prevented beforehand and the print processing can efficiently and securely be executed.

Embodiment 2

Next, an image processing system, a memory control method and a memory management program related to the second embodiment of the present invention will be described.

In the above-mentioned first embodiment, in order to control the interval of the ACK (acknowledge) signal notification with the control section 31, the remaining amount of the node and the remaining amount of the capacity were computed. However, with respect to the case in which the print data is transmitted from the client 10 using the image processing system and to a case in which the document is read using the scanner function of the image processing apparatus 30, there may be a case in which the user verifies whether the image data can be stored in the memory section 35 of the image processing apparatus 30.

When considering such case, "usage quantity %" and "remaining amount %" are indicated on the panel operation section 33 of the image processing apparatus 30. However, conventionally, since the display is performed based only on the capacity (area of the storage area), for example, in case when the image data of very small size is stored, there had been a problem that the node reaches the limit before using up the storage area of the memory section and the overflow occurred.

For example, in case when the capacity of the memory section 35 is 1 GB and the number of manageable nodes is 10,000, and up to 80,000 nodes were used, many small sized image data are memorized and it can be expected that the small sized image data will continue to be memorized in the similar manner. Therefore, even when about the half of the capacity is remaining at this time, it is more appropriate to display that the remaining amount as 20%. On the other hand, in case when 800M of the capacity are used up, even when only 1,000 nodes are used, the capacity will overflow in 200M. Therefore, it is appropriate to display that the remaining amount as 20%. Therefore, the above-mentioned problem can be solved when displaying "remaining amount 20%" for the lesser of the used up 800M and the used up 8,000 nodes.

Accordingly, in this embodiment of the present invention, the control section 31 (memory management section 31a) of the image processing apparatus 30 computes the remaining amount of the node and the remaining amount of the capacity in accordance with the flow chart of FIG. 4 of the first embodiment. After comparing those remaining amounts, the control section 31 (memory management section 31a) of the image processing apparatus 30 performs a control to display the lesser of the remaining amounts onto the panel operation section 33. The display configuration in the panel operation section 33 is arbitrary. The remaining amount may be displayed as "remaining amount **%" and whether the remaining amount is of the node or of the capacity may be indicated. Also both of the remaining amounts of the node and the remaining amount of the capacity may be displayed on the panel operation section 33. The flow may be arranged so that a user can select between the remaining amount of the node, and the remaining amount of the capacity.

Thereby, the defect, such as the occurrence of overflow from having a small remaining amount of the node although the capacity fully remains, can be prevented beforehand. Thus, the print processing and the reading processing can efficiently and securely be executed.

Each of the above-mentioned embodiments illustrated the case where the data control method of the present invention was applied to an image processing system. However, this invention is not limited to the above embodiments. This invention can similarly be applied to an arbitrary management apparatus that memorizes arbitrary data.

What is claimed is:
1. An image processing system comprising:
a client connected to a network which converts document data created by an application into print data in Page Description Language form;
a controller connected to the network which develops the print data transmitted from the client through the network to image data of bit map form and transmits the image data; and
an image processing apparatus connected to the controller which receives the image data of bit map form transmitted from the controller and memorizes the image data in a memory section of the image processing apparatus for printing the image data;
wherein the image processing apparatus comprises:
a management table for managing whereabouts of the image data;
the memory section for memorizing the image data; and
a control section for calculating a remaining ratio of nodes of the management table and a remaining ratio of the memory;
wherein the control section selects one of the remaining ratio of nodes and the remaining ratio of the memory section where the selected remaining ratio is smaller than the other remaining ratio; and wherein the control section increases an interval of a notice to the controller that permits transmission of next image data to the image processing apparatus when the remaining ratio of nodes is selected and a remaining amount of nodes becomes less than or equal to a threshold value, or when the remaining ratio of the memory section is selected and a remaining amount of the memory section becomes less than or equal to a threshold value.

2. The image processing system of claim 1, wherein the control section displays a state of the memory section on a panel of the image processing apparatus, and wherein the control section displays the selected remaining ratio being smaller than the other remaining ratio on the panel.

3. The image processing system of claim 1, wherein the image processing apparatus further comprises a printer section which prints an image base on the image data.

4. A memory management method for an image processing system, the image processing system including a client connected to a network which converts document data created by an application into print data in Page Description Language form, a controller connected to the network which develops the print data transmitted from the client through the network to image data of bit map form and transmits the image data, and an image processing apparatus connected to the controller which receives the image data of bit map form transmitted from the controller and memorizes the image data in a memory section of the image processing apparatus for printing the image data, the image processing apparatus including a management table for managing whereabouts of the image data, the memory section for memorizing the image data, and a control section for calculating a remaining ratio of nodes of the management table and a remaining ratio of the memory section, the memory management method comprising:

selecting one of the remaining ratio of nodes and the remaining ratio of the memory section where the selected remaining ratio is smaller than the other remaining ratio; and increasing an interval of a notice to the controller that permits transmission of next image data to the image processing apparatus when the remaining ratio of nodes is selected and a remaining amount of nodes becomes less than or equal to a threshold value, or when the remaining ratio of the memory section is selected and a remaining amount of the memory section becomes less than or equal to a threshold value.

5. The method of claim 4, further comprising the step of displaying a state of the selected remaining ratio being smaller than the other remaining ratio on a panel of the image processing apparatus.

6. A non-transitory computer readable storage medium storing a program for controlling a control section of an image processing apparatus, the image processing apparatus including a management table for managing whereabouts of image data of bit map form and a memory section for memorizing the image data, the program comprising the steps of:

calculating a remaining ratio of nodes of the management table and a remaining ratio of the memory section;

selecting one of the remaining ratio of nodes and the remaining ratio of the memory section, where the selected remaining ratio is smaller than the other remaining ratio; and increasing an interval of a notice to a controller that permits transmission of next image data to the image processing apparatus when the remaining ratio of nodes is selected and a remaining amount of nodes becomes less than or equal to a threshold value, or when the remaining ratio of the memory section is selected and a remaining amount of the memory section becomes less than or equal to a threshold value.

7. The program of claim 6, further comprising the step of displaying a state of the selected remaining ratio being smaller than the other remaining ratio on a panel of the image processing apparatus.

* * * * *